US012663327B2

(12) United States Patent
Lopatin et al.

(10) Patent No.: US 12,663,327 B2
(45) Date of Patent: Jun. 23, 2026

(54) PRESSURE SENSOR, IN PARTICULAR FOR PRESSURES OF MORE THAN 100 BAR

(71) Applicant: Endress+Hauser SE+Co. KG, Maulburg (DE)

(72) Inventors: Sergey Lopatin, Lörrach (DE); Igor Getman, Lörrach (DE); Jan Schleiferböck, Rümmingen (DE); Romuald Girardey, Blotzheim (FR); Dietmar Leuthner, Weil am Rhein (DE); Sylwester Szymanski, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 331 days.

(21) Appl. No.: 18/684,699

(22) PCT Filed: Jul. 22, 2022

(86) PCT No.: PCT/EP2022/070620
§ 371 (c)(1),
(2) Date: Feb. 19, 2024

(87) PCT Pub. No.: WO2023/025485
PCT Pub. Date: Mar. 2, 2023

(65) Prior Publication Data
US 2025/0027828 A1     Jan. 23, 2025

(30) Foreign Application Priority Data
Aug. 27, 2021     (DE) ..................... 10 2021 122 224.9

(51) Int. Cl.
*G01L 11/06*          (2006.01)
*G01H 5/00*          (2006.01)
(Continued)

(52) U.S. Cl.
CPC ................ *G01L 11/06* (2013.01); *G01H 5/00* (2013.01); *G01L 9/0016* (2013.01);
(Continued)

(58) Field of Classification Search
CPC ... G01L 11/06; G01L 9/0016; G01L 19/0046; G01L 19/0092; G01H 5/00; G01N 29/024; G01S 7/539; G01S 15/88; G01F 1/666
See application file for complete search history.

(56) References Cited

U.S. PATENT DOCUMENTS

| | | | | | |
|---|---|---|---|---|---|
| 4,172,387 | A | * | 10/1979 | Ezekiel | ................ G01L 13/025 73/725 |
| 6,038,961 | A | * | 3/2000 | Filippi | ................ G01L 19/0645 29/454 |

(Continued)

FOREIGN PATENT DOCUMENTS

| | | |
|---|---|---|
| DE | 2922566 A1 | 1/1980 |
| DE | 102005009818 A1 | 9/2006 |

(Continued)

OTHER PUBLICATIONS

DE-102020214765-A1, English translation (Year: 2022).*

*Primary Examiner* — Ryan D Walsh
(74) *Attorney, Agent, or Firm* — Christopher R. Powers; Endress+Hauser (USA) Holding, Inc.

(57) ABSTRACT

A pressure sensor for measuring high pressures includes: a housing having a sealed volume filled with a compressible fill liquid, wherein the housing includes an elastically deflectable diaphragm having a rear side facing the filled volume and a front side opposite the rear side such that the diaphragm transmits a pressure applied to the front side of the diaphragm to the fill liquid; and a measuring unit adapted to ascertain a variable dependent on velocity of sound in the fill liquid and, based on the measured variable, to determine (Continued)

a pressure measured value representing the pressure on the front side of the diaphragm, wherein the fill liquid contains an organic compound, which is present in the fill liquid at a volume fraction of greater than 99%.

19 Claims, 4 Drawing Sheets

(51) Int. Cl.

| | | |
|---|---|---|
| *G01L 9/00* | (2006.01) | |
| *G01L 19/00* | (2006.01) | |
| *G01N 29/024* | (2006.01) | |
| *G01S 7/539* | (2006.01) | |
| *G01S 15/88* | (2006.01) | |
| *G01F 1/66* | (2022.01) | |

(52) U.S. Cl.

CPC ...... *G01L 19/0046* (2013.01); *G01L 19/0092* (2013.01); *G01N 29/024* (2013.01); *G01S 7/539* (2013.01); *G01S 15/88* (2013.01); *G01F 1/666* (2013.01)

(56) References Cited

U.S. PATENT DOCUMENTS

| | | | | |
|---|---|---|---|---|
| 2006/0144871 A1* | 7/2006 | Van Tuyl | ............. | G01N 29/032 73/32 A |
| 2022/0381638 A1* | 12/2022 | Dorr | .................... | G01N 27/221 |

FOREIGN PATENT DOCUMENTS

| | | | | | |
|---|---|---|---|---|---|
| DE | 102005009851 | A1 | | 9/2006 | |
| DE | 102011081544 | A1 | | 1/2013 | |
| DE | 102020214765 | A1 * | 5/2022 | .......... | G01L 9/0041 |
| EP | 3159670 | A1 | | 4/2017 | |
| WO | 2016024041 | A1 | | 2/2016 | |

* cited by examiner

PRESSURE SENSOR, IN PARTICULAR FOR PRESSURES OF MORE THAN 100 BAR

CROSS-REFERENCE TO RELATED APPLICATIONS

The present application is related to and claims the priority benefit of German Patent Application No. 10 2021 122 224.9, filed Aug. 27, 2021, and International Patent Application No. PCT/EP2022/070620, filed Jul. 22, 2022, the entire contents of which are incorporated herein by reference.

TECHNICAL FIELD

The invention relates to a pressure sensor, in particular, a pressure sensor for measuring high pressures, for example, pressures above 100 bar.

BACKGROUND

The measuring of high pressures plays an important role, for example, in the case of hydrogen storage tanks, where pressures of greater than 700 bar and even up to 1500 bar can be experienced. Conventional, capacitive measuring principle based, pressure sensors have a diaphragm, which is elastically deflected by a pressure acting on the front side of the diaphragm, whereby the capacitance between an electrode arranged on the rear side of the diaphragm and an opposite, static electrode is changed. Capacitive pressure sensors produce, dependent on this capacitance change, an electrical measurement signal, which represents the pressure acting on the front side of the diaphragm and, thus, can serve for determining a pressure measured value. The accuracy of measurement of such capacitive pressure sensors depends on the movement of the diaphragm as a function of pressure. The maximum diaphragm movement, thus, limits the maximum pressure measuring range. The applicability of this measuring principle for high pressures is, consequently, questionable.

Higher static pressures can be measured by means of piezoresistive sensors. Such sensors can be manufactured, for example, using SOI technology ("Silicon on Insulator" technology), and especially using SOS technology ("Silicon on Sapphire" technology). This sensor type is embodied, for example, as a pressure sensor chip comprised of a platform and a measuring diaphragm arranged on the platform. A pressure difference applied on the measuring diaphragm leads to a deflection of the measuring diaphragm dependent on the pressure difference. Such is registered by means of a piezoresistive transducer, which comprises piezoresistive elements arranged on or in the measuring diaphragm, for example, piezoresistive elements connected together to form a resistance measurement bridge, and which produce an electrical measurement signal dependent on the deflection of the measuring diaphragm and available for further processing or evaluation for ascertaining a pressure measured value.

Pressure sensor chips are, as a rule, very sensitive and are therefore frequently not directly exposed to a process medium, whose pressure is to be measured. Instead, pressure transfer means filled with a pressure transmitting liquid are interposed. These pressure transfer means use an isolating diaphragm in contact with the medium, e.g., a process medium, whose pressure is to be measured.

Such piezoresistive pressure sensors can, indeed, measure high pressures. However, they have some disadvantages. The materials, of which the measuring diaphragm or other parts of the sensor deformable by the pressure to be measured are made, exhibit a small creep and/or plastic deformation. These effects can lead within the usual service life of pressure sensors to a noticeable zero-point drift of the sensors and are, therefore, not negligible. Also, the piezoresistive resistance elements exhibit aging phenomena in the course of the service life of the sensor. In operation, deformable components can likewise exhibit aging or fatigue phenomena during the service life. Added to this comes the sensitivity of the piezoresistive elements of the sensor chip to chemical attack (corrosion, oxidation), which requires a very good protection of the sensor chip from the environment, e.g., from condensate. These make the structure and, correspondingly, the manufacture of such pressure sensors very demanding.

Described in DE 10 2005 009818 A1 is a method for measuring pressure, wherein the pressure prevailing in a space is introduced into a chamber filled with a measurement fluid and sealed from the space and a measured variable dependent on the acoustic properties of the measurement fluid is determined as measure for the pressure. In particular, in DE 10 2005 A1, an example of an embodiment is set forth, in which the velocity of sound in the measurement fluid is ascertained by means of an ultrasonic transducer arrangement, which determines the travel time of an ultrasonic signal within the chamber filled with the measurement fluid as measure for the pressure. Examples of measurement fluids given are water and silicone oil.

Water has, as a strongly polar liquid, a relatively high compression modulus of about 2.2 GPa at a temperature of 20° C. Because of this, the change of the velocity of sound as a function of pressure in water is correspondingly small. This prevents sufficiently precise pressure measurement in the desired measuring range. Better suited is silicone oil, which has a lower compression modulus at 20° C. The chemical composition of silicone oil can, however, vary depending on manufacturer and batch. Also, the physical properties of silicone oil can change during operation of the pressure measuring system, e.g., due to changes of the molecular composition, for example, in that linear molecular chains are converted under temperature and/or pressure influences into cyclic compounds or diols. As a result, also the relationship between velocity of sound and pressure in the silicone oil can change over the service life. From all of this, calibration becomes a burden, both during manufacture and over the service life of the pressure measuring system.

SUMMARY

It is, therefore, an object of the invention to provide a pressure sensor, which is suitable for measuring high pressures and which exhibits stable, e.g., essentially drift-free, operation over a long time period, in order to keep maintenance activities as little as possible.

The object is achieved by a pressure sensor according to the present disclosure. Advantageous embodiments of the pressure sensor are further disclosed.

The pressure sensor of the invention, especially a pressure sensor suitable for pressures of more than 100 bar, comprises:

a housing, which has a sealed, for example, hermetically sealed, volume filled with a compressible fill liquid, wherein the housing has an elastically deflectable diaphragm, which has a rear side facing the volume filled with the fill liquid and a front side opposite the rear side, in such a manner that the diaphragm transmits a pressure lying on the front side of the diaphragm to the fill liquid; and a measuring unit, which is adapted to ascertain a variable dependent on velocity of sound in the fill liquid and, based on the measured variable, to determine a pressure measured value representing the pressure lying on the front side of the elastically deflectable diaphragm, wherein the fill liquid contains an organic compound, which is present in the fill liquid at a volume fraction of greater than 99%.

The fill liquid is a compressible liquid, i.e., its volume changes as a result of the deflection of the diaphragm by compression or decompression of the liquid. Equally, the pressure prevailing in the fill liquid changes correspondingly. Accompanying that is a change of the velocity of sound in the fill liquid. Thus, the velocity of sound in the compressible fill liquid is a measure for the pressure lying on the front side of the elastically deflectable diaphragm prevailing outside of the housing.

While in the case of the above-mentioned, conventional piezoresistive or capacitive sensors registering measured variables depending directly on the deflection of a measuring diaphragm, effects such as creep, deformation or fatigue of the diaphragm or components supporting the diaphragm degrade the accuracy of measurement greatly, such effects play no role in the case of the pressure sensor of the invention. A measuring of the velocity of sound in the fill liquid can be performed, for example, based on the propagation of ultrasonic waves along a measurement path within the volume filled with the liquid. This measurement path can extend between two non-deflectable wall regions of the housing during normal operation of the pressure sensor. Thus, creep or fatigue in the region of the deflectable diaphragm do not influence measurement performance in the case of the pressure sensor of the invention. Maintenance is significantly less compared to the known piezoresistive pressure sensors or capacitive pressure sensors. Additionally, the measuring principle of the invention enables a comparatively very simple sensor construction with robust components and corrosion resistant materials, such that the service life of the pressure sensor is high.

An essential advantage of the pressure sensor of the invention compared with the measuring systems known in the state of the art results from the use of a fill liquid, which contains an organic compound, which is present in the fill liquid at a volume fraction of greater than 99%. The compressibility, thus the compression modulus, of an essentially pure organic compound changes, other than in the case of silicone oil, for example, thus not from batch to batch or over the service life of the pressure sensor.

Advantageously, the volume fraction of the organic compound in the fill liquid is greater than 99.9% or greater than 99.99%.

The pressure sensor of the invention requires no special calibration in the manufacture, since the functional dependence of the velocity of sound on the pressure prevailing in the liquid is ascertainable once for the liquid and can then be stored in the measuring unit of each pressure sensor manufactured with such liquid as fill liquid. Moreover, the properties of the pure compound do not change during the service life of the pressure sensor. Thus, the sensor of the invention is operable maintenance free over long periods of time.

The organic compound contained in the fill liquid has advantageously a compression modulus of less than 2.0 GPa at 20° C. For example, the organic compound can be an essentially nonpolar compound. Nonpolar compounds have a lower compression modulus than polar compounds such as water.

In an advantageous embodiment, the organic compound is in the liquid state at the intended temperature and pressure range of use of the pressure sensor. At least the organic compound is in the liquid state in the intended pressure measuring range of the pressure sensor at temperatures at least between 0° C. and 50° C., advantageously at least between –20° C. and 100° C., more advantageously at least between –40° C. and 150° C. The intended pressure measuring range can lie between 100 and 1500 bar, preferably between 100 and 5000 bar.

Suitable compounds based on the above set forth properties are selected, for example, from the following substance classes: saturated aliphatic hydrocarbons, alcohols, or esters, for example, glycerides. Examples of saturated alcohols with the desired properties include n-octanol or propylene glycol, for aliphatic hydrocarbons n-decane, and for esters propylene glycol dicaprate, 1,2-propylene glycol diacetate or propylene carbonate. The main or side chains of the organic compound should, in general, contain no more than 10 carbon units in order to assure that the compound is liquid in the desired temperature range and stable against thermal degradation. In an advantageous embodiment, the fill liquid is thermally stable at least up to a temperature of 100° C., preferably at least up to a temperature of 200° C.

The elastically deflectable diaphragm can be embodied as a conventional isolating diaphragm of a diaphragm seal. It is preferably so flexibly embodied that it can handle volume changes of the fill liquid of at least ±10%, preferably at least ±20% and, in such case, depending on the pressure lying on the diaphragm, remains elastically deflectable throughout the total measuring range of the pressure sensor.

The measuring unit can comprise at least one ultrasonic transducer, which is arranged on or in a wall of the housing for transmitting and/or receiving ultrasonic waves propagating along a measurement path extending through the fill liquid. Additionally, the measuring unit can further comprise a measuring circuit, especially a measuring electronics, which is adapted to excite the at least one ultrasonic transducer for transmitting ultrasonic waves and/or to receive and to process output signals of the at least one ultrasonic transducer, in order to ascertain a value of the variable dependent on the sound velocity of the ultrasonic waves in the fill liquid. The one or more ultrasonic transducers can be piezoelectric or magnetostrictive transducers, for example. Differently from the case of the moisture sensitive piezo resistances on a deformation body, such as can be applied in the case of the above-described piezoresistive pressure sensors, the piezoelectric or magnetostrictive transducers of the pressure sensor of the invention can be potted completely in plastic without influencing of the sensor functionality, such that moisture is not a problem for measuring characteristics of the sensor.

The measuring circuit, thus the measuring electronics, can be adapted to determine the pressure measured value from the ascertained value of the variable dependent on velocity of sound in the fill liquid and can comprise a processor, memory, and one or more operating programs executable by the processor. The one or more operating programs can be adapted to operate the ultrasonic transducer for performing the measuring of the velocity of sound or a variable dependent thereon and further to process digitized output signals of the ultrasonic transducer for determining the pressure measured value.

The housing can in an advantageous embodiment include the measuring unit and a diaphragm unit, wherein the volume filled with the fill liquid includes a measuring chamber formed in the measuring unit, a capillary tube and a pressure chamber formed in the diaphragm unit and sealed by the diaphragm, wherein the measuring chamber and the pressure chamber communicate with one another via the capillary tube, and wherein the measurement path extends through the measuring chamber.

The volume filled by the fill liquid is advantageously selected to be as small as possible in order that thermal expansion of the fill liquid does not lead at increased temperatures to such a large deflection of the elastic diaphragm that the measurement capability of the pressure sensor is endangered, e.g., by plastic deformation of the diaphragm. In the above-described embodiment, the volumes of the pressure chamber and the capillary tube can be minimized.

Additionally, the pressure sensor can have a temperature detector, which is adapted to produce an electrical measurement signal dependent on the temperature of the fill liquid. Since the velocity of sound in the fill liquid depends also on the temperature of the fill liquid, the pressure sensor in this embodiment is in advantageous manner suitable by means of the temperature measurement signals of the temperature detector to perform a temperature compensation for ascertaining more accurate pressure measured values.

For such purpose, the above-mentioned measuring circuit can be adapted, when ascertaining pressure measured values, to use measurement signals of the temperature detector for a temperature compensation. The measuring circuit can be connected with the temperature detector in order to receive and to process its measurement signals.

The measuring unit can be embodied to produce the electrical measurement signal based on a travel time method. In such case, the variable dependent on velocity of sound of the ultrasonic waves in the fill liquid is a travel time of an ultrasound pulse along the measurement path. The measurement path can in this embodiment have a length of 15 to 20 mm, preferably 15 to 18 mm. This assures sufficient accuracy of the travel time measurement at simultaneously as small as possible volume of the fill liquid.

Alternatively, the measuring unit can be embodied to produce the electrical measurement signal based on a resonance method. In this embodiment, the variable dependent on velocity of sound in the ultrasonic waves in the fill liquid for ascertaining the pressure measured values is a resonant frequency, or a variable dependent on a resonant frequency, at which a standing wave forms along the measurement path. Especially advantageous in such a resonance method is that the measurement path can be shorter than in case of a travel time measurement, namely, between 5 and 10 mm. Thus, the pressure sensor has in this embodiment an even smaller filling liquid volume.

As mentioned, the measuring unit can have at least one ultrasonic transducer, which serves for transmission and/or receipt of ultrasonic waves moving along the measurement path. Optionally, the measuring unit can have a single ultrasonic transducer, when the ultrasonic waves transmitted along the measurement path are reflected on an area opposite the ultrasonic transducer and the measurement path is traveled twice, forth and back. For producing standing waves in a resonance method, the measuring unit can also have two ultrasonic transducers arranged on or in opposite walls of the housing. The measuring unit can, in such case, be adapted to excite the two ultrasonic transducers with equal phase. For the application described here, piezoelectric transducers or magnetostrictive transducers are suitable.

The mentioned measuring circuit can be adapted to excite a first ultrasonic transducer with an excitation signal for producing ultrasonic waves. The measuring circuit can further be adapted to register and/or to process an output signal of the first or a second ultrasonic transducer, in order to ascertain the variable dependent on velocity of sound of the ultrasonic waves in the fill liquid.

For example, the measuring circuit can be adapted to excite the first ultrasonic transducer with an excitation pulse, such that the first ultrasonic transducer transmits an ultrasound pulse along the measurement path into the fill liquid, and to measure a travel time of the ultrasound pulse. For this, the measuring circuit can be adapted to register an output signal of the second ultrasonic transducer serving in this embodiment as receiver of the ultrasound pulse after its having passed through the measurement path and to measure a time difference between the transmitting and the receiving of the ultrasound pulse.

In another embodiment, the measuring circuit can be adapted to excite the at least one ultrasonic transducer with a frequency sweep and based on the output signal to register an impedance of the ultrasonic transducer or a phase difference between the excitation signals and the output signals as a function of frequency of the excitation signal. Additionally, the measuring circuit can be adapted to ascertain from the impedance or phase difference as a function of frequency of the excitation signal one or more resonance frequencies, at which a standing ultrasonic wave forms along the measurement path.

The regions of the wall surrounding the measuring chamber and not components of the deflectable diaphragm can be embodied solidly with thick walls in order to withstand high pressure. The wall can have, for example, a thickness in the range of 2 to 6 mm. This wall thickness is sufficient for materials, e.g., stainless steels, serving as housing materials for pressure sensors in order to assure the desired mechanical stability. Advantageously, the at least one ultrasonic transducer is arranged in or on these wall regions such that the length of the measurement path remains constant independently of the pressure prevailing outside of the housing. Another advantage of this embodiment is that the solid wall provides a uniform temperature distribution in the region of the measurement path.

The diaphragm can be composed of a metal alloy, e.g., a stainless steel, a duplex steel, tantalum, titanium, silver, brass, or bronze. The housing can likewise be made of one of these materials or, to the extent that it does not contact the medium whose pressure is to be measured, of a lesser corrosion resistant material, e.g., an alloyed, high-grade steel, such as e.g., a chromium-nickel steel.

In a method for pressure measurement by means of the above-described pressure sensor, the measuring unit ascertains a variable dependent on velocity of sound in the fill liquid and determines, based on such variable, a pressure measured value representing the pressure lying on the front side of the elastically deflectable diaphragm. The method can comprise a travel time method or a resonance method for determining the variable dependent on velocity of sound in the fill liquid. In the case of a travel time method, a time span is ascertained, which an ultrasonic signal pulse requires to travel over a measurement path extending through the fill liquid. A resonance method can comprise the exciting of at least one ultrasonic transducer by means of a frequency sweep and the registering of an output signal of the at least one ultrasonic transducer. For example, an impedance or a phase difference can be registered as a function of frequency of the excitation signal. From the impedance or phase difference as a function of frequency of the excitation signal, one or more resonance frequencies can be ascertained, at which a standing wave forms along the measurement path. Based on the resonance frequencies, the velocity of sound can be ascertained and, derived therefrom, the pressure measured value. A temperature compensation can be performed, such as described above.

BRIEF DESCRIPTION OF THE DRAWINGS

The invention will now be explained in greater detail based on examples of embodiments illustrated in the figures. Equal reference characters refer in the figures to identically embodied components of the illustrated sensors or sensor components. The figures of the drawings show as follows.

DETAILED DESCRIPTION

Figure 1:
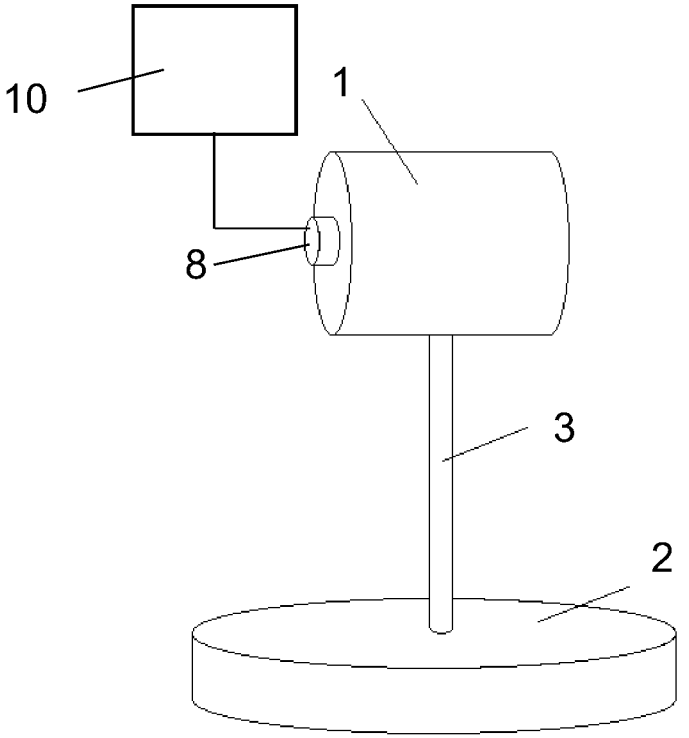
FIG. 1 shows a schematic view of a pressure sensor according to a first example of an embodiment according to the present disclosure.

FIG. 1 shows schematically a pressure sensor according to a first example of an embodiment.

Figure 2:
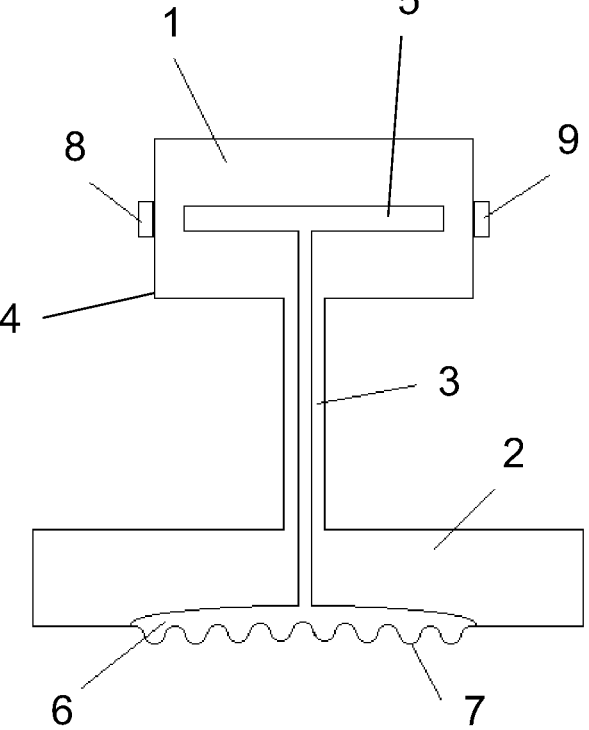
FIG. 2 shows a schematic view of a longitudinal section of the housing of the pressure sensor shown in FIG. 1.

FIG. 2 shows the housing of the pressure sensor in a schematic, longitudinally sectioned illustration. The pressure sensor includes a measuring unit 1, a diaphragm unit 2, and a capillary tube 3. These components are provided in a housing 4, which surrounds a hermetically sealed, closed volume. This volume is completely filled by a compressible fill liquid. The volume is composed of a measuring chamber 5 arranged in the measuring unit 1, a pressure chamber 6 formed in the diaphragm unit 2 and the internal volume of the capillary tube 3, via which the measuring chamber 5 and the pressure chamber 6 are in communication with one another.

The diaphragm unit 2 comprises a platform, which has on a side a recess, which is covered by an elastically deflectable diaphragm 7, such that the pressure chamber 6 is formed between the diaphragm 7 and the floor of the recess. The platform can serve at the same time as a connecting means, e.g., as a flange, for connecting the diaphragm unit 2 to a container, e.g., a process container or a pipe, whose internal pressure is to be measured by means of the pressure sensor. The platform can, alternatively, be connected to such a connecting means. If the platform is connected to the container as described, the diaphragm 7 is then in communication with the interior of the container, such that the pressure prevailing in the container lies on the pressure chamber 6 far, front side of the diaphragm 7. Depending on the pressure prevailing in the container, which is applied to the front side of the diaphragm 7, the diaphragm is correspondingly elastically deflected. The pressure prevailing in the container is, thus, transmitted via the diaphragm 7 to the fill liquid. In the case of pressure changes in the container, the deflection of the diaphragm 7 changes and, thus, the volume filled with the compressible fill liquid changes.

Diaphragm 7 can be formed in the present example of a metal or metal alloy, e.g., a stainless steel such as 1.4435, 1.4404, duplex steel 1.4462, tantalum, titanium, silver, brass, bronze, or others. The selection of the material of the diaphragm 7 can depend on the intended application in which the pressure sensor is to be applied. For monitoring hydrogen tanks, for example, a diaphragm 7 of bronze is especially advantageous. Diaphragm 7 can be connected with the platform by a soldered or welded connection. The material of the platform and the total housing can likewise be a metal or metal alloy, especially those mentioned above as diaphragm materials.

The measuring unit 1 has a solid wall, which surrounds the measuring chamber 5. The capillary tube 3 passes through the wall into the measuring chamber 5. The velocity of sound in the compressible fill liquid filling the measuring chamber 5 depends on the pressure prevailing in the fill liquid. In the equilibrium state, such pressure equals the ambient pressure lying on the front side of the pressure dependently deflected diaphragm 7, thus the pressure in the container to which the pressure sensor is secured for measurement. This ambient pressure is, thus, ascertainable by measurement of the velocity of sound in the fill liquid. The measuring principle on which the pressure sensor works is based on this.

The measuring unit 1 can have one or more ultrasonic transducers. In the present example, two mutually opposing ultrasonic transducers 8, 9 are placed externally on opposing side walls of the housing 4. In an alternative embodiment, the ultrasonic transducers can also be integrated into the wall of the housing, such that the transducers are in direct contact with the fill liquid in the measuring chamber. The two ultrasonic transducers 8, 9 lie in the present example opposite one another in such a manner that a measurement path extending between them extends in the longitudinal direction of the measuring chamber 5 and therewith through the fill liquid filling the measuring chamber 5.

The ultrasonic transducers 8, 9 are connected with a measuring circuit 10. Measuring circuit 10 can be an analog measuring circuit. In advantageous manner, the measuring circuit 10 is, however, a measuring electronics, which comprises a processor, memory and, stored in the memory, operating programs, which can be executed by the measuring electronics for operating the ultrasonic transducer 8, 9 and for registering and processing measurement signals of the ultrasonic transducers 8, 9 for determining pressure measured values. The measuring electronics 10 can show the pressure measured value via a display and/or communicate such via a communication interface by wire or wirelessly, e.g., by radio, to a superordinated unit or to a service or operating device.

Figure 3:
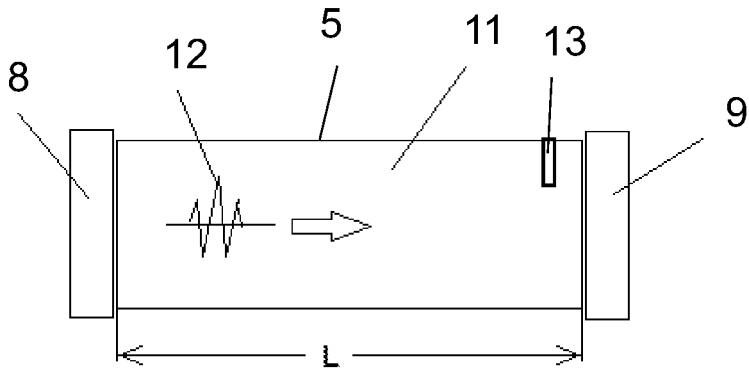
FIG. 3 shows a schematic view of the measurement path of the pressure sensor shown in FIG. 1 where pressure measurement is by means of ultrasound according to a travel time method.

FIG. 3 shows schematically the measurement path 11 extending between the ultrasonic transducers 8, 9, in order to illustrate the principle of pressure measurement with the pressure sensor according to the first example of an embodiment according to FIGS. 1 and 2. The measurement path 11 extends between the transmitting transducer 8 and the receiving transducer 9. The ultrasonic transducers 8, 9 serving as transmitting transducer 8 and receiving transducer 9 can be embodied essentially identically. They can be piezoelectric transducers, for example; however, also magnetostrictive transducers can be used.

Measuring circuit 10 is adapted to excite the transmitting transducer 8 with an electrical signal such that via the wall of the housing it couples an ultrasound pulse 12 into the measuring chamber 5. After having traveled the measurement path 11, the ultrasound pulse 12 passes through the wall of the housing to reach the receiving transducer 9. This converts received ultrasonic signals into an electrical measurement signal, which is received and processed by the measuring circuit 10, in order to ascertain a travel time of the ultrasound pulse 12 through the fill liquid from the transmitting transducer 8 to the receiving transducer 9. The actual travel time $t_L$ along the measurement path of length L extending through the fill liquid can be ascertained using the echo signals arising at the interfaces between the housing wall and the liquid.

From the ascertained travel time $t_L$, the velocity of sound c of the ultrasonic wave in the fill liquid transmitted by the transmitting transducer 8 can be ascertained according to the formula:

$$c = L/t_L.$$

This is temperature and pressure dependent. In order to ascertain a pressure measured value from the velocity of sound, consequently, the temperature in the fill liquid must be known and be kept as uniform and constant as possible during the measuring. In the present example, the housing 4 has, consequently, in the region of the measuring unit 1, a substantial wall to assure a uniform temperature distribution. An additional advantage of this substantial wall is that it resists the high pressures, for which the pressure sensor is intended, without deforming.

In the present example, the pressure sensor includes a temperature detector 13, which can be applied for temperature compensation. Temperature detector 13 is connected with the measuring circuit 10 to provide such with temperature measurement signals. Measuring circuit 10 is adapted to receive and to process the temperature measurement signals, especially in order to ascertain from the measured travel time a pressure measured value normalized to a reference temperature. For this, calibration data can be stored in a memory of the measuring circuit 10.

In the present example, the measurement path 11 extending between the ultrasonic transducers 8, 9 has a cylindrical shape with a diameter of 2-4 millimeters and a length between 15 and 30 mm. In order to keep the volume of the fill liquid as small as possible, the length amounts advantageous to only between 15 and 20 mm. Used as fill liquid is a triglyceride, which is liquid at room temperature. In order to achieve sufficient accuracy of the pressure measurement, it is advantageous to apply a temperature detector 13 with an accuracy of ±0.05 to 0.01 K.

Figure 4:
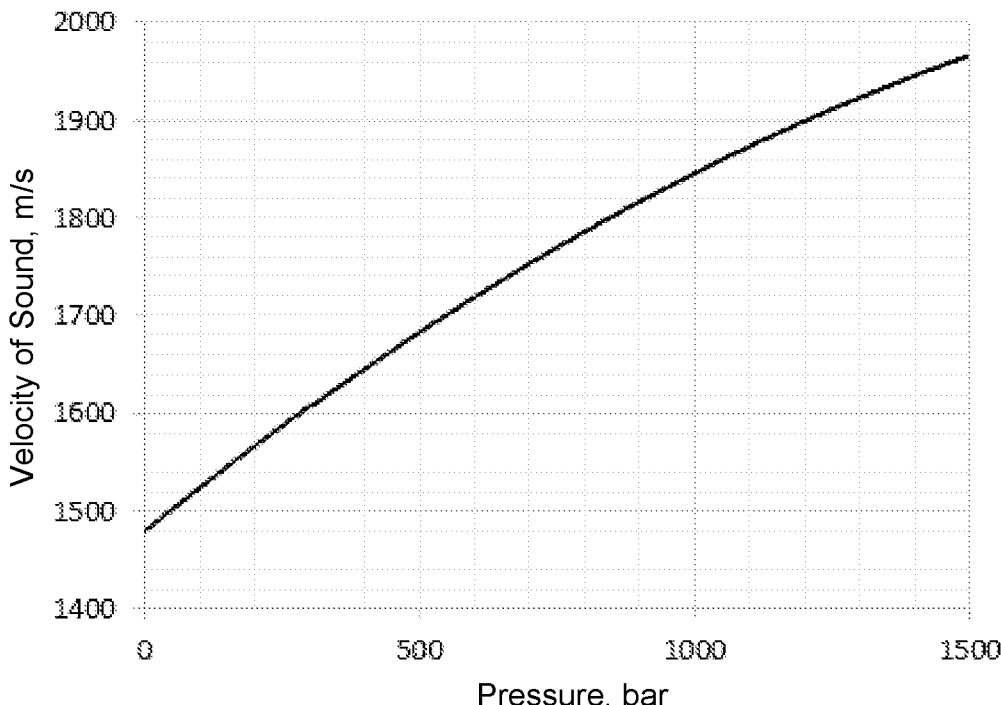
FIG. 4 shows a graph of velocity of sound (m/s) in a liquid based on triglyceride as a function of pressure (bar) at constant temperature.

FIG. 4 shows velocity of sound of the ultrasound transmitted from the transmitting transducer 8 at 20° C. in a triglyceride-based liquid as a function of pressure. Such characteristic lines/curves of velocity of sound as a function of pressure and temperature are stored in a memory of the measuring circuit 10, for example, in functional or tabular form, and the measuring circuit 10 is adapted, based on such characteristic lines/curves, to ascertain from the observed travel time or from the velocity of sound derived from the travel time a measured value of the pressure lying on the diaphragm 7 of the pressure sensor.

Suitable compressible fill liquids are primarily nonpolar organic liquids, i.e., such organic compounds that are liquid in an application temperature range lying, e.g., in an interval between −40° C. and 200° C. Such organic substances have typically main or side chains with greater than 2 and less than 10 carbon units. For example, these are saturated alcohols such as n-octanol, propylene glycol or paraffins such as n-decane, esters such as propylene glycol dicaprate, 1,2-propylene glycol diacetate, propylene carbonate, and short chain polysiloxanes such as decamethyltetrasiloxane. Advantageously, these materials are thermally stable in the application temperature range, e.g., between −40° C. and 200° C., or in an interval, which lies within limits, e.g., 0° C. to 100° C.

If an oil containing a mixture of different chemical compounds is used, it is required, or at least advantageous, to ascertain the characteristic lines/curves for the velocity of sound as a function of pressure and temperature, in each case, for a given batch of the oil by calibration in the production of the pressure sensor and to store such in a memory of the pressure sensor. Such is, most often, required because the exact composition of the oil in terms of the individually contained chemical compounds can differ from batch to batch. In the case of some oils, e.g., silicone oils, the molecular composition of the oil can change over the lifetime of the pressure sensor and therewith the physical properties of the fill liquid. Such can require re-calibrations of the pressure sensor during its service life.

It is therefore advantageous to use as fill liquid a single substance having a purity of at least 99 vol-% because, in such case, the corresponding characteristic lines/curves of the pure substance can be stored in the measuring electronics of the pressure sensor and do not differ from one another among different batches of the fill liquid. A first calibration in the production of the pressure sensor is, consequently, not required.

Since the measurement path 11 and the fill liquid composed of a pure material remain unchanged during the lifetime of the pressure sensor, the measuring unit 1 of the pressure sensor exhibits no aging phenomena. In contrast with the case of pressure sensors known in the state of the art, an aging or creep of the diaphragm 7 plays no role because these effects have no noticeable effects on the compressing of the fill liquid and on the sound velocity measurement along the measurement path in the measuring unit. In contrast with the case of the silicone oil as fill liquid in DE 10 2005 009818 A1, a thermally stable pure material as fill liquid remains unchanged during the total service life. The pressure sensor described here thus enables a maintenance free operation of the pressure sensor over a length of time of operation, which is longer by orders of magnitude than the maintenance free length of time of operation of conventional pressure sensors. On the whole, also the production effort for the pressure sensor described in the present example of an embodiment and the pressure sensors described in the additional examples of embodiments is significantly less than for piezoresistive sensors.

The housing of the pressure sensor can be made vacuum tight, for example, of metal or a metal alloy. That prevents, for an optimally designed sensor construction, a failure of the joint location. The simple construction enables use of the sensor for high pressure applications from 100 bar to 1500 bar or more, e.g., for pressure monitoring of hydrogen tanks.

For such purpose, a diaphragm 7 sealing against hydrogen diffusion can be used. The sensor can be used for the total pressure range between 100 bar and up to 2000 bar or even up to 5000 bar.

Figure 5:
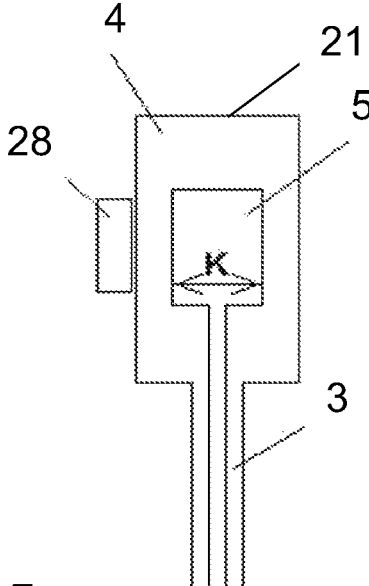
FIG. 5 shows a schematic, longitudinally sectioned illustration of a measuring unit of a pressure sensor according to a second example of an embodiment according to the present disclosure.

FIG. 5 shows a measuring unit 21 for a pressure sensor according to a second example of an embodiment and enabling pressure measurement based on measurement of the velocity of sound. Measuring unit 21 serves for ascertaining a variable representing the pressure-dependent velocity of sound using a resonance method. FIG. 5 shows only the measuring unit 21 and a section of the capillary tube 3, which connects the measuring unit 21 with the diaphragm unit (not shown) of the pressure sensor. The diaphragm unit of the pressure sensor according to the second example of an embodiment can be embodied identically to the diaphragm unit of the pressure sensor according to the first example of an embodiment, which was described based on FIGS. 1 to 3.

Measuring unit 21 includes a housing 4, which surrounds the measuring chamber 5. Such is quite analogous to the first example of an embodiment filled with a compressible fill liquid, which also fills the capillary tube 3 and a pressure chamber formed in the diaphragm unit. A deflection of the diaphragm in the direction of the pressure chamber effects, thus, a compression of the fill liquid, which results in a change of the velocity of sound in the fill liquid. For producing a measurement signal dependent on velocity of sound, the measuring unit 21 includes a single piezoelectric transducer in the form of ultrasonic transducer 28. Additionally, the measuring unit includes (not shown in FIG. 5) a measuring circuit, which excites the piezoelectric transducer with a continuous excitation signal, whose frequency continuously increases or decreases as a function of time, this being referred to in the following as frequency sweep. The frequency range of this frequency sweep can have a width of about 0.3 to 0.5 MHz. When the separation K between the opposite walls of the measuring chamber 5 corresponds to a whole numbered multiple n of half wavelength $\lambda$ of the ultrasonic wave produced from the transducer 28, a standing wave forms in the measuring chamber 5. The following equation holds for the frequencies $F_n$, at which this resonance state is fulfilled:

$$F_n = \frac{nc}{2K}.$$

Figure 7:
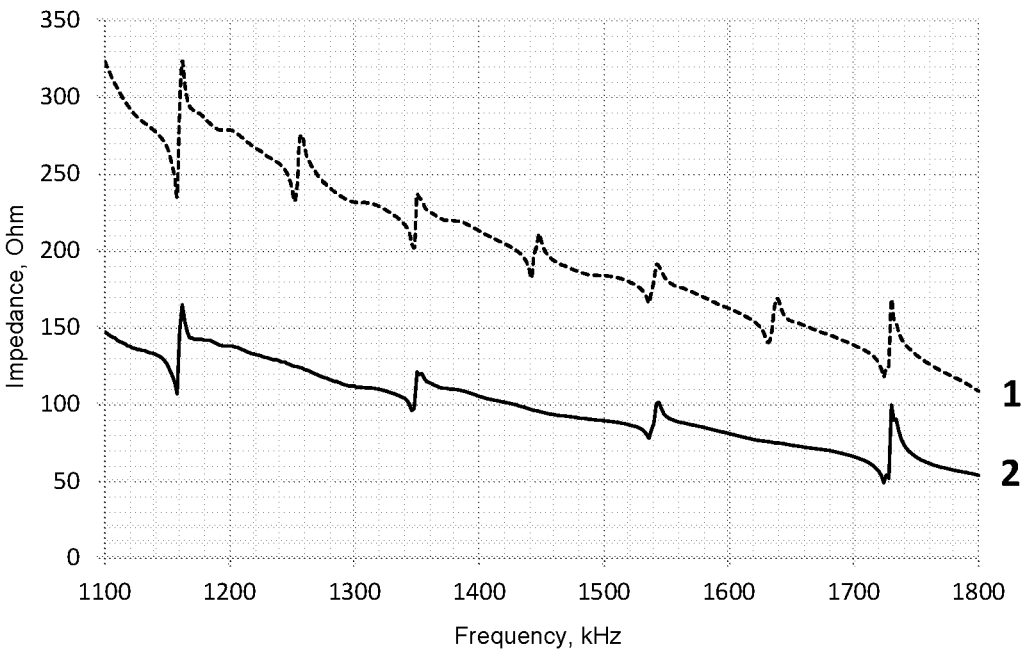
FIG. 7 shows a graph of impedance (ohm) as a function of frequency (kHz) for the measuring units illustrated in FIGS. 5 and 6.

These resonance frequencies $F_n$, at which such a standing wave forms in the measuring chamber 5, can be ascertained based on the impedance of the ultrasonic transducer 28 and/or the phase difference (referred to herein as phase for short) between excitation and output signals of the ultrasonic transducer 28. The typical behavior of the impedance of the ultrasonic transducer 28 in the measuring unit 21 of FIG. 5 as a function of frequency of the excitation signal is shown in FIG. 7 as the dashed curve (1). The measuring was performed using a triglyceride-based fill liquid. The resonance frequencies are at the abrupt changes of the impedance. Typical behavior of phase as a function of frequency of the excitation signal of the ultrasonic transducer 28 for the measuring unit 21 according to FIG. 5 appears in FIG. 8 as the dashed curve (1). At the resonance frequencies, an abrupt rise of the phase is to be observed. The abrupt changes of the impedance and/or phase as a measurement signal can be used by the measuring circuit for detecting the resonance frequencies. Based on the above set forth equation relating resonance frequency and velocity of sound, which, in turn, depends on pressure and temperature, a measuring circuit or measuring electronics of the pressure sensor can derive a pressure measured value from the ascertained resonance frequencies.

A change of the velocity of sound in the fill liquid due to a pressure change and/or temperature change causes a change of the resonance frequency. In ascertaining a pressure measured value, it is, consequently, advantageous, to ascertain at least two neighboring resonance frequencies $F_n$ and $F_{n+1}$, in order to determine the value of n according to the formula:

$$n = \frac{F_n}{F_{n+1} - F_n}.$$

Figure 6:
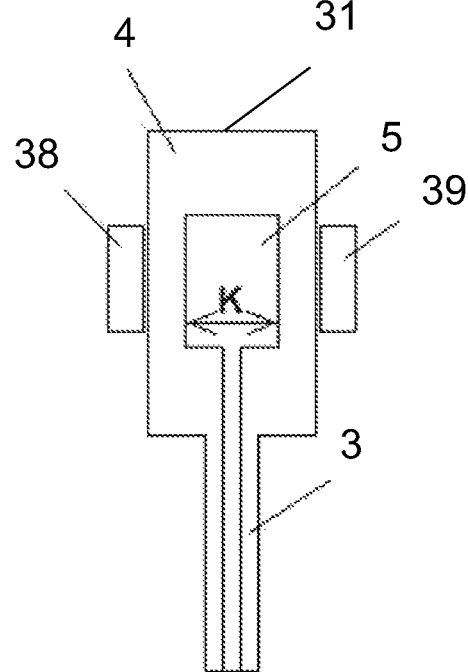
FIG. 6 shows a schematic, longitudinally sectioned illustration of a measuring unit of a pressure sensor according to a third example of an embodiment according to the present disclosure.

The time and calculative effort associated with the finding and evaluating two neighboring resonance frequencies can be avoided by using two ultrasonic transducers. Such an example of an embodiment will now be described using FIG. 6. FIG. 6 shows a measuring unit 31 of a pressure sensor according to a third example of an embodiment, in the case of which the pressure measurement likewise occurs based on a measurement of the velocity of sound. As in the case of the measuring unit 21 of the second example of an embodiment, measuring unit 31 includes a housing 4 having a wall, which surrounds a measuring chamber 5. Measuring chamber 5 is filled with a compressible fill liquid. The interior of the measuring chamber communicates via the capillary tube 3 with a pressure chamber of a diaphragm unit (not shown), which can be embodied analogously to the diaphragm unit 2 of the pressure sensor illustrated in FIGS. 1 to 3 showing the first example of an embodiment. By deflection of the diaphragm of the diaphragm unit and corresponding pressure change in the compressible fill liquid, the velocity of sound changes in the fill liquid.

The velocity of sound of ultrasound in the fill liquid is ascertained in the measuring unit 31 of this example of an embodiment by means of an alternative of the previously described example of a resonance method. Here, the measuring unit 31 includes a first ultrasonic transducer 38, which is placed on a first wall of the housing 4 in such a manner that it can transmit and/or receive ultrasonic waves along a measurement path extending through the measuring chamber 5. Additionally, measuring unit 31 includes a second ultrasonic transducer 39, which is placed on a wall opposite the first wall of the housing 4 in such a manner that it can transmit and/or receive ultrasonic waves along the measurement path in the opposite direction to the ultrasonic waves transmitted from the first ultrasonic transducer 38. A measuring circuit of the measuring unit 31 connected with the two piezoelectric transducers is adapted to excite the transducers 38, 39 with equal phase and to measure the impedance and/or phase of the first and second ultrasonic transducers 38, 39, which are electrically connected in parallel. The excitation frequency is, in such case, varied quite analogously to the above described second example of an embodiment as a function of time in the form of a frequency sweep. A standing ultrasonic wave forms, when the separation K between the opposite walls of the measuring chamber 5 corresponds to an even numbered multiple n (with n=2N) of half the wavelength $\lambda$ of the ultrasonic waves transmitted from the transducers 38, 39. In the case of exciting the mutually opposing ultrasonic transducers 38, 39 with equal phase, no resonances occur for uneven numbered multiples of half the wavelength corresponding to (n=2N+1).

Figure 8:
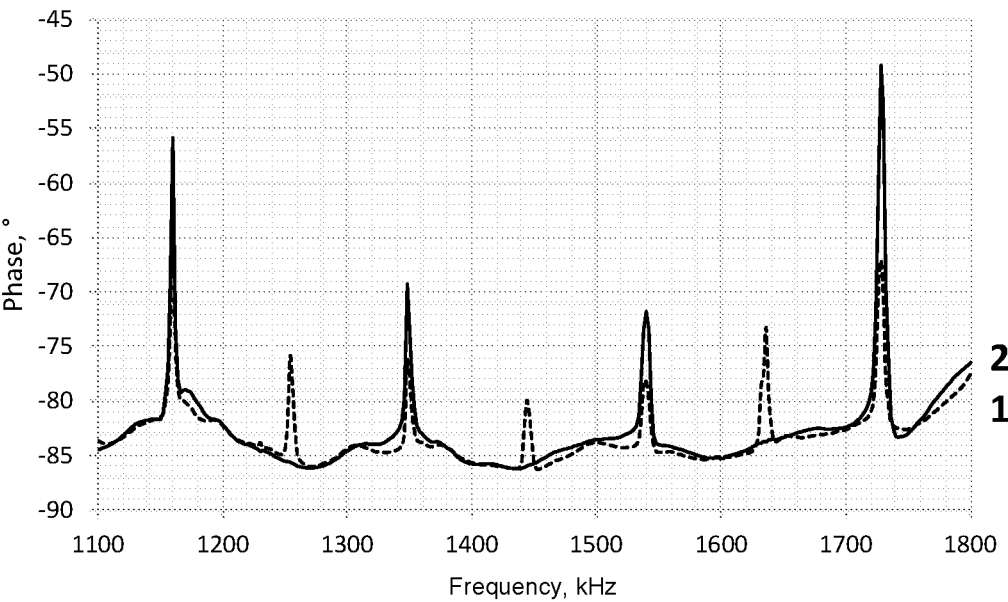
FIG. 8 shows a graph of phase difference (degrees) as a function of frequency (kHz) for the measuring units illustrated in FIGS. 5 and 6.

Shown in FIGS. 7 and 8 are the curves of impedance and phase of one of the transducers 38, 39 as a function of frequency, in each case, as the solid curve (2). As in the case of the second example of an embodiment, the measurement signals were registered for a triglyceride-based liquid. If the above set forth resonance condition is fulfilled, the impedance and the phase each exhibit an abrupt change. It can be seen that resonances ascertained with the measuring unit according to the third example of an embodiment coincide always with each second of the resonances detected with the measuring unit 21 of the second example of an embodiment. In manner analogous to the second example of an embodiment, the measuring circuit of the pressure sensor can according to the third example of an embodiment be adapted to ascertain resonance frequencies based on the behavior of impedance or phase and to determine a pressure measured value based on the relationships set forth above. Advantageous in measuring unit 31 is that the frequency separations between the resonance frequencies are sufficiently large that the frequency range, in which a resonant frequency shifts as result of a pressure and/or temperature change in the fill liquid, is typically less than frequency separation between two neighboring resonance frequencies. Thus, as a rule, a pressure measured value can be determined reliably based on ascertaining a single resonant frequency.

In the case of both examples of embodiments for pressure measurement by means of a resonance method, the measuring units 21, 31 can, in each case, have a temperature sensor, whose measurement signal serves for temperature compensation of the measured values of the measuring circuit. Such can happen in manner analogous to the first example of an embodiment described based on FIGS. 1 to 3.

The invention is not limited to the above-described examples of embodiments. Thus, it is possible to ascertain the velocity of sound in the fill liquid based on further, alternative methods known in the state of the art. Also, it is possible to use, instead of one or more piezoelectric transducers, other means for producing standing waves in the fill liquid, e.g., magnetostrictive transducers.

The invention claimed is:

1. A pressure sensor, comprising:
a housing, which includes a sealed volume filled with a compressible fill liquid,
wherein the housing includes an elastically deflectable diaphragm, which has a rear side facing the volume filled with the fill liquid and a front side opposite the rear side, the diaphragm operable to transmit a pressure applied to the front side of the diaphragm to the fill liquid; and
a measuring unit configured to ascertain a variable dependent on a velocity of sound in the fill liquid and, based on the measured variable, to determine a measured pressure value representing the pressure applied to the front side of the diaphragm,
wherein the fill liquid comprises an organic compound, which is present in the fill liquid at a volume fraction of greater than 99%.

2. The pressure sensor according to claim 1, wherein the organic compound is a nonpolar compound.

3. The pressure sensor according to claim 1, wherein the organic compound is in the liquid state in an intended pressure measuring range of the pressure sensor at least in a temperature range between 0° C. and 50° C.

4. The pressure sensor according to claim 1, wherein the organic compound is a saturated alcohol, an ester, an ether, or an aliphatic hydrocarbon.

5. The pressure sensor according to claim 1, wherein the organic compound is thermally stable at least up to a temperature of 100° C.

6. The pressure sensor according to claim 1, wherein the measuring unit comprises:
at least one ultrasonic transducer, which is arranged on or in a wall of the housing and configured to transmit and/or receive ultrasonic waves propagating along a measurement path; and
a measuring circuit configured to excite the at least one ultrasonic transducer as to transmit ultrasonic waves and/or to receive and to process output signals of the at least one ultrasonic transducer as to ascertain a value of the variable dependent on the velocity of sound of the ultrasonic waves in the fill liquid.

7. The pressure sensor according to claim 6, wherein:
the housing includes the measuring unit and a diaphragm unit;
the volume filled with the fill liquid includes a measuring chamber, a capillary tube, and a pressure chamber, each formed in the diaphragm unit and sealed by the diaphragm;
the measuring chamber and the pressure chamber communicate with each other via the capillary tube; and
the measurement path extends through the measuring chamber.

8. The pressure sensor according to claim 6, wherein the measuring circuit is further configured to determine the measured pressure value from the ascertained value of the variable dependent on the velocity of sound.

9. The pressure sensor according to claim 8, further comprising a temperature detector, which is operable to generate an electrical measurement signal dependent on a temperature of the fill liquid.

10. The pressure sensor according to claim 9, wherein the measuring circuit is configured to use measurement signals of the temperature detector for temperature compensation when determining the measured pressure value.

11. The pressure sensor according to claim 1, wherein the variable dependent on velocity of sound in the fill liquid is a travel time of an ultrasound pulse along the measurement path.

12. The pressure sensor according to claim 1, wherein the variable dependent on velocity of sound in the fill liquid is a resonant frequency, or another variable dependent on a resonant frequency, at which a standing wave forms along the measurement path.

13. The pressure sensor according to claim 1, wherein a wall of the housing surrounding the measuring chamber has a thickness of at least 2 mm.

14. The pressure sensor according to claim 13, wherein the thickness of the wall of the housing surrounding the measuring chamber is 2 to 6 mm.

15. The pressure sensor according to claim 1, wherein the elastically deflectable diaphragm is composed of a metal alloy.

16. The pressure sensor according to claim 15, wherein the metal alloy comprises at least one of a stainless steel, a duplex steel, tantalum, titanium, silver, brass, or bronze.

17. The pressure sensor according to claim 1, wherein the pressure sensor is configured to be operable at measured pressures greater than 100 bar.

18. The pressure sensor according to claim 1, wherein the pressure sensor is configured to be operable at measured pressures of at least 2000 bar.

19. The pressure sensor according to claim 6, wherein the measuring circuit includes measuring electronics.

\* \* \* \* \*